2,782,173

PRODUCTION OF POLYVINYL ACETATE BEADS AND EMULSIONS

John E. Bristol and Edward P. Czerwin, Niagara Falls, and Norris Turnbull, Grand Island, N. Y., assignors to E. I. du Pont de Nemours & Company, Wilmington, Del., a corporation of Delaware No Drawing. Application May 15, 1953, Serial No. 355,406

7 Claims. (Cl. 260—29.6)

This invention is concerned with improved methods for the production of polyvinyl acetate and of vinyl acetate copolymers in aqueous dispersion and more particularly with dry solid beads.

The dispersion of polyvinyl acetate and of vinyl acetate copolymers is usually accomplished during and incidental to the polymerization process itself. For many purposes these methods of dispersing the polymer are quite satisfactory. However, for some purposes these methods are not satisfactory and require improvement.

It is known in the polymerization arts that the molecular weight and the melting point of the polymers produced can be more carefully controlled and predetermined if polymerization is carried out in non-aqueous solvents. The kind and amount of solvent used is important and largely determines the degree of polymerization. Thus, if a 50% solution of vinyl acetate is polymerized in methanol with benzoyl peroxide catalyst a polyvinyl acetate is produced with a molar viscosity as determined by standard methods in benzene solution of about 5 centipoises. This viscosity, which is related to polymer molecule size, is consistently reproducible. And if a higher viscosity polymer is required, for example, 60 centipoises, this can be done by polymerizing vinyl acetate monomer as a 90% solution in methanol, using the same catalyst. Using different solvent and different concentrations any predetermined viscosity of the polymer can be obtained within a wide range of possibilities. The same conditions apply to the production of copolymers when the vinyl acetate is the larger component. The rate of polymer formation depends upon other factors, particularly pressure and temperature.

This invention has for its object the preparation of dispersed forms of polyvinyl acetate and copolymers of vinyl acetate in which the polyvinyl acetate is the predominant component. Another object is the preparation of the polymers in bead form. A further object is the preparation of beads of vinyl acetate polymers and copolymers containing substantially no organic or aqueous solvents. A further object is the production of dispersed forms of polymers of predetermined molecular size and viscosity and the dispersion of such polymers by means of partially or incompletely hydrolyzed polyvinyl alcohol. Other objects will be apparent in the further discussion of this invention.

The objectives of this invention can be accomplished by having a performed polymer or copolymer of vinyl acetate in an organic solvent and mixing this solution with a dilute aqueous solution of polyvinyl alcohol, said polyvinyl alcohol having been formed from polyvinyl acetate by hydrolysis of between about 75 to 95% of the acetate groups to hydroxyl groups. The mixing of the two solutions must be accompanied by adequate agitation so that proper dispersion of the polymer will take place. The solvent can be removed from the mixture during the process of dispersion which preferably takes place at a temperature such that the solvent will be vaporized. If an aqueous dispersion or emulsion of polyvinyl acetate or copolymer is desired the process will be so regulated as to result in the desired amount of total solids and water. Generally such emulsion will contain between about 40 to 65% solids. For many purposes we prefer about 50 to 60% solids in the emulsion. If, on the other hand, the product is desired in dry bead form, the water can be removed by procedures such as are given in connection with the examples which follow.

Vinyl acetate polymers and copolymers can be dispersed according to the present invention by mixing the polymer in the polymerizing mixture with water containing the required amount of dispersing agent, namely polyvinyl alcohol resulting from the incomplete hydrolysis of polyvinyl acetate. Or, if desired, solid polymer may be dissolved in water miscible or immiscible organic solvents or in mixtures of solvents and then be dispersed by mixing such solution of polymer with water and dispersing agent followed by removal of solvent or solvents by distillation.

Essentially, then, this invention discloses a new method of manufacture of polyvinyl acetate beads or dispersions. It is based on the emulsification in water of polyvinyl acetate formed by polymerization in solvents. The solvent is recovered during the isolation of the product which may be in bead form. The superiority of this system of formation of polyvinyl acetate dispersions is due to the separation of the polymerization step from the step of dispersion of the polymer in the bead or emulsion form. This is in contrast to the present complex art which cites the simultaneous polymerization of vinyl acetate in the presence of polymerization regulators and dispersion of the polymer. This is an art which requires highly skilled operators to conduct on a commercial scale.

Example 1

One thousand grams of a 50% solution of polyvinyl acetate in methanol (molar solution of polymer in benzene having a viscosity of about 5 centipoises) was added to 500 grams of water at 45° C. in a 3-neck, 2-liter flask fitted with a stirrer, steam inlet and distillation head. About 5 grams of 88% hydrolyzed polyvinyl alcohol, whose 4% aqueous solution was about 55 cp. in viscosity, was then added. The agitated mixture was distilled to recover the methyl alcohol solvent and form the polyvinyl acetate beads. The polymer was dispersed in the form of fine beads, largely, 0.1 to 0.3 cm. in diameter after approximately one-third of the methyl alcohol had been distilled off. Additional polyvinyl alcohol (2 grams) was added at intervals during the distillation to maintain the dispersion. The slurry of beads was cooled and they were later filtered and washed. The polyvinyl acetate beads were dried largely at a low pressure (i. e., ca. 2 mm. Hg pressure). The polyvinyl acetate beads were utilized in a hot metal adhesive formulation.

Example 2

Thirty-five pounds of water was placed in a stainless steel vessel fitted with a stirrer and a distillation head. The water was heated to 45° C. by circulation of hot water through the jacket and 70 pounds of a methyl alcohol solution (50% solids) of polyvinyl acetate (molar solution of polyvinyl acetate in benzene of 5 cps. viscosity) was added. About 0.4 pound of 88% hydrolyzed polyvinyl alcohol, whose 4% aqueous solution had a viscosity of about 55 cps. was added and the agitated mixture was distilled to recover the solvent methyl alcohol. The polymer was dispersed in the form of small beads and additional increments of polyvinyl alcohol were added to prevent coalescense of the particles. A total of 1.4 pounds of polyvinyl alcohol was used. After distillation of the solvent from the polyvinyl acetate, the slurry of polyvinyl acetate was cooled to about 30° C. and filtered. The beads were washed with cold water. The total time required for dispersing the polymer, distilling off the solvent and formation of the polyvinyl acetate beads was three hours. The beads were air dried at room temperature and were screened through an 8 mesh/sq. in. standard screen. Over 30 pounds of clear spherical beads of polyvinyl acetate were obtained which were mainly 8 to 20 mesh in size.

*Example 3*

The following materials were used for the preparation of a polyvinyl acetate dispersion:

(1) Polyvinyl acetate solution containing 36% polyvinyl acetate, 4% methanol and 60% vinyl acetate—500 grams;
(2) Water—200 grams;
(3) Steam—as required;
(4) 88% hydrolyzed polyvinyl alcohol, 4% solids in water of 55 cps. viscosity—12 grams.

The polyvinyl alcohol was slurried as a paste in 100 cc. of the polyvinyl acetate solution and was added to the stirred water in a 1-liter, 3-neck flask fitted with steam inlet, stirrer and distillation head. The rest of the polyvinyl acetate solution was added over a 10-minute period while the mixture was continuously agitated and the mixture was heated in a steam bath and steam was injected to recover the vinyl acetate and methanol.

A poor initial dispersion of the polyvinyl acetate in water was obtained. The quality of the emulsion improved as the solvents were distilled off. The final pot temperature was 85° C. About 70% of the emulsion particles were 1 to 3 microns in diameter as determined by microscopic examination. The resulting emulsion was viscous (ca. 1000 cps.) and smooth. It was slightly grainy due to the presence of some larger particles. The air dried film of the emulsion was slightly cloudy. Although it was somewhat rough, the general appearance was good. It would compare favorably with emulsions used commercially.

*Example 4*

Two reactors were set up in series, each being provided with means to feed raw materials to it and means to overflow when the contents reached a given volume, in this case 900 cc. Each reactor was provided with reflux means, stirring means and means to heat the contents. Polymerization of a liquid mixture of crotonic acid and vinyl acetate took place in the first reactor and dispersion of the copolymer produced in the first reactor took place in the second reactor, which we may call the granulator or disperser. Unpolymerized monomer separated from the polymer in the disperser (second vessel) was returned to the first reactor or polymerizer.

In a particular operation the first reactor was charged with 900 cc. of a mixture of 95% vinyl acetate and 5% crotonic acid to which between about 0.2 to 1% of a catalyst such as benzoyl peroxide was added. Polymerization at reflux temperature was allowed to proceed in the first reactor until the solids content (copolymer) rose to about 30%. At this point a mixture of 95% vinyl acetate, 5% crotonic acid together with the necessary catalyst was fed to the first reactor (polymerizer) at a rate of between 6 to 12 cc. per minute, corresponding to the rate of polymerization so that the continuous overflow to the second reactor (disperser) contained about 30% of polymer. The rate of overflow into the disperser was about the same as the rate of monomer feed to the polymerizer.

The partially polymerized mixture of copolymer and monomer discharged into the second reactor (disperser) was treated with an aqueous solution of a polyvinyl alcohol of about 88% hydrolysis and a viscosity corresponding to 55 cps. in an amount corresponding to 0.2% by weight of the copolymer dispersed.

The copolymer became dispersed into beads while the contents of the second reactor were agitated and the unpolymerized monomer mixture was removed by a steaming operation. The suitably washed and dried monomer recovered from the steaming operation was recycled to the first reactor. The beads formed in the second vessel were allowed to settle into a U tube and thereafter they were washed by a stream of cold water and separated on a collecting screen. The beads were then treated with a suitable lubricant to prevent agglomeration and were then dried in a current of air. Analysis of the vinyl acetate-crotonic acid copolymer so formed indicated the following:

Volatiles _____ percent__ 3.3
Reduced viscosity, 20° C_____ 0.35
Crotonic acid (combined) _____ percent__ 6.87

This product was readily soluble in a hot dilute solution of sodium carbonate. An aqueous solution of the ammonium salt of the copolymer gives excellent results as a size and finish for fabrics.

By partially hydrolyzed polyvinyl alcohol we refer to polyvinyl acetate in which not all of the acetate groups have been replaced by hydroxyl. We have found that polyvinyl acetate having between about 75 to 95% of its acetate groups replaced by hydroxyl can be used as dispersing agents for dispersing polyvinyl acetate or copolymers thereof. Our preferred partially hydrolyzed polyvinyl alcohol is a polyvinyl acetate having between about 80 and 90% of the acetate groups replaced by hydroxyl.

The effectiveness of the partially hydrolyzed polyvinyl alcohols depend to a certain extent on their viscosities. Partially hydrolyzed polyvinyl alcohols of 5 to 70 cps. are effective dispersers. The grade of polyvinyl alcohol which is usually preferred for this use is prepared by hydrolysis of polyvinyl acetate to the extent of 80 to 90%. Polyvinyl alcohol of 85–90% hydrolysis, whose 4% aqueous solution is about 40 to 70 cps. in viscosity is especially preferred.

The polymer beads may be coated with lubricants or anti-blocking agents such as magnesium stearate or rosin to prevent agglomeration when they are dried.

When small amounts of partially hydrolyzed polyvinyl alcohols are used as dispersers coarser grained beads or particles of polyvinyl acetate are formed than when larger amounts are used. We have found that between about 0.4 to 6% of disperser can be used based on the weight of the polyvinyl acetate or its copolymers. The preferred range of disperser lies between about 0.04 to 4.0%.

By copolymers of vinyl acetate we refer to copolymers in which the vinyl acetate comprises the larger part of the copolymer, such as 80% or more. Generally we refer to copolymer composed of at least 90% vinyl acetate.

We claim:

1. A process for preparing a dispersion of polyvinyl acetate comprising polymerizing at reflux temperature in the presence of polymerization catalyst vinyl acetate to a solids content of about 30% by weight and thereafter mixing the polymerizate with agitation and heat with an aqueous solution containing 0.04 to 1% by weight based on the polyvinyl acetate of polyvinyl alcohol hydrolyzed between about 80 and 90% and recovering the unreacted vinyl acetate by distillation.

2. A process for preparing a dispersion of a copolymer of vinyl acetate and crotonic acid comprising polymerizing at reflux temperature in the presence of polymerization catalyst a mixture comprising about 95% vinyl acetate and about 5% crotonic acid to a copolymer solids content of about 30% by weight of the mixture and thereafter mixing the resultant copolymer containing mixture with an aqueous solution containing 0.04 to 1% by weight based on the copolymer of polyvinyl alcohol hydrolyzed between about 80 and 90% and recovering the unreacted vinyl acetate by distillation.

3. A process for preparing beads of a copolymer of vinyl acetate and crotonic acid comprising polymerizing at reflux temperature in the presence of polymerization catalyst a mixture comprising about 95% vinyl acetate and about 5% crotonic acid to a copolymer solids content of about 30% by weight of the mixture and thereafter mixing the resultant copolymer containing mixture with an aqueous solution containing 0.04 to 1% by weight based on the copolymer of polyvinyl alcohol hydrolyzed between about 80 and 90% and recovering the unreacted vinyl acetate by distillation and recovering the dispersed copolymer as substantially dry and vinyl acetate free beads.

4. A process for preparing a dispersion of polyvinyl acetate comprising continuously feeding vinyl acetate and a polymerization catalyst into a polymerization zone, polymerizing said vinyl acetate and withdrawing polymerization mixture from said polymerization zone continuously at a rate to correspond to about 30% conversion of vinyl acetate to polymer continuously dispersing said withdrawn mixture with water in the presence of 0.04 to 6% based on the total solids present of a partially hydrolyzed polyvinyl alcohol, agitating said water dispersion and removing the unreacted vinyl acetate therefrom by distillation.

5. A process for preparing a dispersion of a copolymer of vinyl acetate and crotonic acid comprising continuously feeding a mixture comprising about 95% vinyl acetate and about 5% crotonic acid and a polymerization catalyst into a polymerization zone, copolymerizing said mixture and withdrawing polymerizing mixture from said polymerization zone continuously at a rate corresponding to about a 30% conversion of vinyl acetate to copolymer, continuously dispersing said withdrawn mixture with water in the presence of 0.04 to 6% based on the total solids present of a partially hydrolyzed polyvinyl alcohol, agitating said water dispersion and removing unreacted vinyl acetate therefrom by distillation.

6. A process for preparing beads of polyvinyl acetate comprising continuously feeding vinyl acetate and a polymerization catalyst into a polymerization zone, polymerizing said vinyl acetate and withdrawing polymerization mixture from said polymerization zone continuously at a rate to correspond to about 30% conversion of vinyl acetate to polymer, continuously dispersing said withdrawn mixture with water in the presence of 0.04 to 6% based on the total solids present of a polyvinyl alcohol being hydrolyzed between about 80 to 90%, agitating and heating said water dispersion and removing the unreacted vinyl acetate therefrom by distillation and recovering the dispersed polymer as substantially dry and vinyl acetate free beads.

7. A process for preparing beads of a copolymer of vinyl acetate and crotonic acid comprising continuously feeding a mixture comprising about 95% vinyl acetate and about 5% crotonic acid and a polymerization catalyst into a polymerization zone, copolymerizing said mixture and withdrawing polymerizing mixture from said polymerization zone continuously at a rate corresponding to about a 30% conversion of vinyl acetate to copolymer, continuously dispersing said withdrawn mixture with water in the presence of 0.04 to 6% based on the total copolymer solids present of a polyvinyl alcohol being hydrolyzed between about 80 to 90%, agitating and heating said water dispersion and removing the unreacted vinyl acetate therefrom by distillation and recovering the dispersed copolymer as substantially dry and vinyl acetate free beads.

References Cited in the file of this patent

UNITED STATES PATENTS

| | | |
|---|---|---|
| 2,176,053 | Billing | Oct. 17, 1939 |
| 2,238,956 | Strother | Apr. 22, 1941 |
| 2,313,144 | Gomm | Mar. 9, 1943 |
| 2,443,893 | Collins | June 22, 1948 |

OTHER REFERENCES

"Elvanol," Du Pont and Company (1947), page 21.